United States Patent [19]

Hulin et al.

[11] Patent Number: 4,524,635
[45] Date of Patent: Jun. 25, 1985

[54] MANUAL CONTROL DEVICE FOR CHANGING SPEEDS INCLUDING A LOCKING OF THE REVERSE SPEED

[75] Inventors: René Hulin, Rueil-Malmaison; Daniel Schuler, St. Remy les Chevreuse, both of France

[73] Assignee: Automobiles Peugeot/Automobiles Citroen, France

[21] Appl. No.: 458,146

[22] Filed: Jan. 14, 1983

[30] Foreign Application Priority Data

Jan. 20, 1982 [FR] France .................. 82 00809

[51] Int. Cl.³ .............................................. F16N 57/06
[52] U.S. Cl. .................... 74/476; 74/473 R; 74/475
[58] Field of Search ............... 74/473 R, 476, 475

[56] References Cited

U.S. PATENT DOCUMENTS

| | | | |
|---|---|---|---|
| 2,040,594 | 5/1936 | Bixby | 74/473 R |
| 2,547,317 | 4/1951 | Gustafson | 74/473 R |
| 3,417,634 | 12/1968 | Dangauthier | 74/473 R |
| 3,757,598 | 9/1973 | Van Dest | 74/473 R |
| 3,805,635 | 4/1974 | Grosseau | 74/473 R |
| 3,939,724 | 2/1976 | Takahashi et al. | 74/475 |
| 3,978,739 | 9/1976 | Hobbensiefken et al. | 74/473 R |
| 4,126,055 | 11/1978 | Forsyth | 74/476 |
| 4,275,614 | 6/1981 | Okubo et al. | 74/476 |
| 4,348,915 | 9/1982 | Leitermann et al. | 74/473 R |
| 4,381,682 | 5/1983 | Kudo et al. | 74/476 |

FOREIGN PATENT DOCUMENTS

| | | | |
|---|---|---|---|
| 1586883 | 3/1970 | France. | |
| 2060641 | 5/1971 | France. | |
| 54-6238 | 1/1979 | Japan | 74/476 |
| 862614 | 3/1961 | United Kingdom | 74/476 |

Primary Examiner—Allan D. Herrmann
Assistant Examiner—Joseph M. Rolnicki
Attorney, Agent, or Firm—Burns, Doane, Swecker & Mathis

[57] ABSTRACT

The selecting rod (5) is pivotally mounted on the gear box (1) by a ball joint (12) and carries, close to the latter, a selecting lever (7, 14). One arm of this lever carries a retractable finger member (18) actuated by a cable (19). This finger member normally cooperates with an abutment (22) of the gear box so as to prevent the selection of the reverse speed, except when a pull is exerted on the cable by raising a sleeve (26) which is slidable on the gear shift lever (4). Application of the device is suited to automobile vehicles.

7 Claims, 3 Drawing Figures

MANUAL CONTROL DEVICE FOR CHANGING SPEEDS INCLUDING A LOCKING OF THE REVERSE SPEED

The invention relates to manual control means for gear boxes of automobile vehicles, of the type comprising, on one hand, a gear shift lever relatively remote from the gear box, carried by a bearing mounted on the body of the vehicle and connected to two movable elements of the gear box through at least one articulated rod and a direction-changing lever so that by means of a given pivoting of the gear shift lever successively in two directions perpendicular to each other, each speed ratio of the gear box is selected and then engaged, and on the other hand, abutment means which cooperate upon the pivoting of the gear shift lever towards its reverse speed position, and means for disengaging said abutment means.

In order to avoid accidentally selecting one of the speed ratios, in particular that corresponding to the reverse-speed of the vehicle, it is known to provide a locking mechanism comprising abutment means which normally prevent the pivoting of the gear shift lever to its reverse speed position; this pivoting can only be achieved by an additional voluntary operation which consists in axially displacing the lever, or an element carried by the lever, this displacement having for effect to disengage each of the abutment means.

In the known arrangements, the abutment means are usually disposed, on one hand, on the gear shift lever, on the other hand, on an element connected to the body of the vehicle. This arrangement has a drawback due to the mobility of the gear box, and consequently of the articulated rod and the levers, relative to the body. Indeed, the cooperation of the abutment means adapted to prevent the selection of the reverse speed, corresponds to a well-determined position of the shift lever relative to the body; but if a displacement of the gear box, or of the engine-drive unit to which this gear box pertains, on its elastically yieldable supports produces a slight pivoting of the gear shift lever, it can occur that the abutment means no longer intervene for the prescribed position of the movable elements of the gear box and consequently the reverse speed might be engaged accidentally, or a speed ratio other than the reverse speed might no longer be capable of being selected. Moreover, the bearing which carries the shift lever is preferably flexible and the position of this lever in respect of which the abutment means cooperates is not constant; the lever pivots slightly by deformation of the bearing when a shifting force is applied thereto; this pivoting is liable to be sufficient to permit the selection of the reverse speed notwithstanding the fact that the abutment means are in their mutual cooperation position.

An object of the invention is to overcome these drawbacks by arranging, in a control device for changing speeds including a gear shift lever remote from the gear box, a mechanism for locking the engagement of the reverse speed which is insensitive to the displacements of the gear box relative to the body of the vehicle.

The invention therefore provides a control device of the aforementioned type, wherein the abutment means are disposed, on one hand, on the gear box, on the other hand, on a lever pivoted to the gear box and connected to the gear shift lever through said rod or through one of said rods.

According to secondary features of the invention:
in one embodiment, one of the abutment means is a retractable locking finger member connected through a transmission cable to the gear shift lever or to an element carried by the latter;
in another embodiment, one of the abutment means is a locking finger member connected to the movable element of an electromagnet which is electrically connected to a switch disposed on gear shift lever;
the device comprises a selecting rod pivotable substantially about its axis, on one hand, in a flexible bearing mounted on the body and located in the vicinity of the gear shift lever, on the other hand, on a universal articulation mounted on the gear box, the gear shift lever being pivotally mounted on said rod to pivot about an axis perpendicular to said rod and to the gear shift lever, the locking finger member is carried by a bell crank lever, said selecting lever which is fixed to the selecting rod in the vicinity of the universal articulation.

Embodiments of a control device according to the invention are described hereinafter with reference to the accompanying drawings in which.

Figure 1:
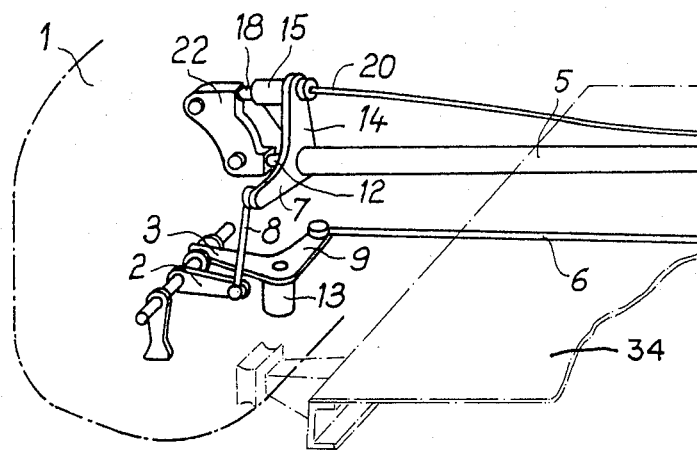
FIG. 1 is a simplified perspective view of a control device according to the invention.

FIG. 1 shows a control device for a gear box 1 of an automobile vehicle 34, which control device is effective to displace in succession two movable elements 2, 3 of the gear box, by transverse displacements (arrows $F_1$, $F_1'$) then longitudinal displacements ($F_2$, $F_2'$) of a substantially vertical gear shift lever 4. The gear box 1 may in particular belong to an engine-drive unit mounted transversely on elastically yieldable supports at the front of the vehicle.

Figure 2:
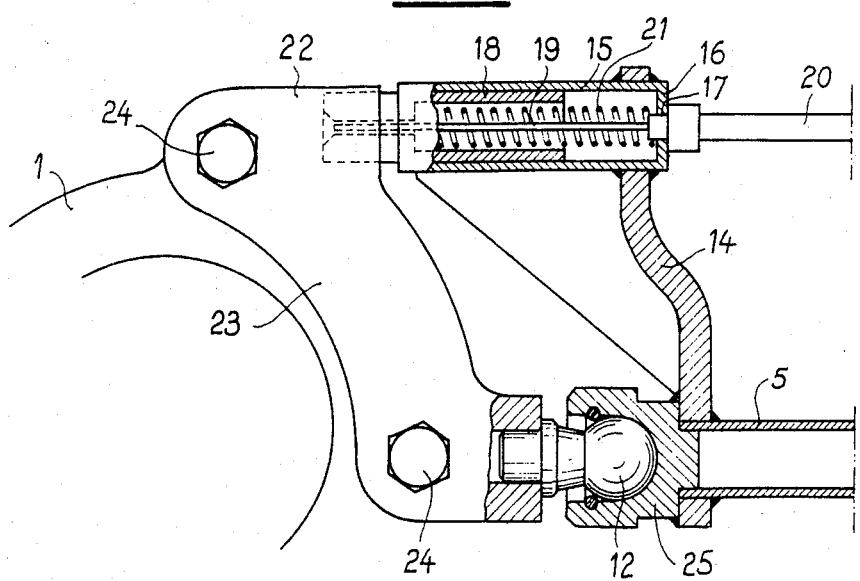
FIG. 2 is a detail, partly sectional, view of a part of said device.

The lever 4 is pivotally mounted on two longitudinal rods 5 and 6. The rod 5 is connected to the movable element 2 through an arm 7 of a lever, termed a selecting lever, connected to the element 2 through a link 8. The other rod 6 is connected through a bell crank lever 9 to the movable element 3. The connection between the lever 4 and the rod 5 is achieved through a transverse pin 10. The rod 5 is carried, on one hand, by the body of the vehicle through a flexible bearing 11 close to the lever 4, and, on the other hand, by the gear box through a universal ball articulation 12 which can be seen in FIG. 2. The rod 5 is consequently capable of turning through about 30° about its axis and pivots a few degrees about a vertical axis passing through the centre of the bearing 11. The rod 6 is connected through universal articulations to a lower extension of the lever 4 and to one arm of the bell crank lever 9, whose other arm constitutes the movable element 3, this lever 9 pivoting in a bearing 13 mounted on the gear box.

The selecting lever is connected to the rod 5, contained in a plane perpendicular to the latter and adjacent to the ball joint 12. It comprises, in addition to the arm 7, another arm 14 at the free end of which is connected a tubular member 15 which is parallel to the rod 5 and includes adjacent to the lever 4, an end wall 16 provided with a centre orifice 17. The member 15 acts as a guide for a cylindrical finger member 18 to which is connected a cable 19 extending through the orifice 17. Outside the guide 15, the cable is surrounded by a sheath 20 whose corresponding end bears against the end wall 16. Disposed inside the guide 15 between the finger member 18 and the end wall 16 is a spring 21 which coaxially enters the finger member and surrounds the cable 19. The compressibility of the spring 21 enables the finger member 18 to slide between a retracted position, in which it is withdrawn into the guide 15, and an active position shown in the two Figures where it distinctly emerges from the guide in the direction away from the lever 4. In this active position, it is so disposed as to cooperate with an abutment 22 formed on an element 23 mounted on the gear box by screws 24. More precisely, the finger member 18 enters into contact with the abutment 22 when the lever 4 is pushed in the direction $F_1$ corresponding to the selection of the reverse speed. Fixed to the element 23 is the ball 12 on which the rod 5 is articulated, this rod having for this purpose an end member 25 forming a spherical seat for the ball.

Slidably mounted on the lever 4 is a sleeve 26 including a holding flange 27 located in the vicinity of a knob 28 carried by the lever 4 at the free end of the latter. The end of the cable 19 opposed to that which is connected to the finger member 18 is secured to a projection 29 on the sleeve, and the corresponding end of the sheath 20 bears against a lug 30 secured to the lever 4. The tension of the cable, produced by the spring 21 which biases the finger member 18 outwardly of the guide 15, normally maintains the sleeve 26 in the lower position thereof. In this position, the driver of the vehicle can engage any speed ratio other than the reverse speed by shifting the gear shift lever 4 by its knob 28 in the directions $F_1'$ and/or $F_2$ or $F_2'$. The positions of the lever arm 14 in which the finger member 18 does not come into contact with the abutment 22 correspond to these movements of the lever 4.

When the driver desires to select the reverse speed, in order to be able to pivot the lever 4, and consequently the lever arm 14, in the direction $F_1$, he must first of all raise the sleeve 26 so as to pull sufficiently on the cable 19, in opposition to the action of the spring 26, so that the finger member 18 is withdrawn from the abutment 22 into the guide 15.

This operation of the withdrawal of the finger member 18 by means of the sleeve 26 constitutes a locking of the engagement of the reverse speed, since it precludes the pivoting in the direction $F_1$, and consequently the selection of the reverse speed, so long as the sleeve 26 is not raised, i.e. in the course of the actuations for engaging the forward speed ratios by shifting the knob 28. This locking is not affected by the displacements of the gear box 1 relative to the body of the vehicle, since the lever 7, 14, which carries the locking finger member 18, is pivotally mounted on the gear box itself, in the vicinity of the abutment means constituted by the finger member 18 and the abutment 22. Consequently, even a marked deviation of the rod 5 about the centre of the bearing 11, which deviation results from a displacement of the gear box, does not result in a substantial displacement of the finger member 18 relative to the gear box and consequently relative to the abutment 22.

By way of a modification, the invention is applicable to other conventional configurations in which the gear shift lever 4 is slightly movable along its axis, i.e. vertically, relative to the body, in opposition to the action of elastically yieldable means which makes it necessary to slide voluntarily this lever 4 for selecting the reverse speed, without the addition of a sliding sleeve such as the sleeve 26. The cable 19 is then secured to the lever itself and the corresponding end member of its sheath 20 bears against the body of the vehicle. It will be understood that, in this case also, for the same reasons as before, the unlocking operation of the finger member 18 is insensitive to the displacements of the gear box relative to the body of the vehicle, owing to the flexibility of the cable 19 and its sheath and to the arrangement of the abutment means.

Figure 3:
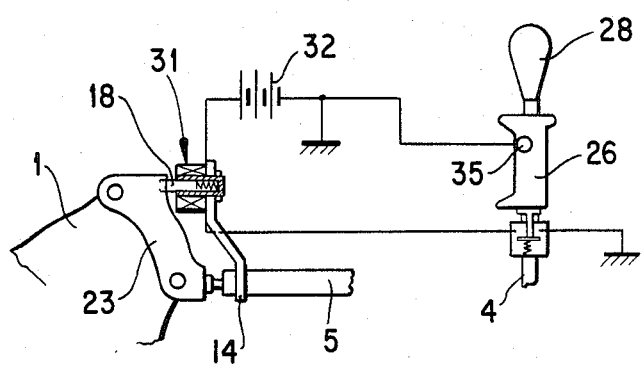
FIG. 3 is a schematic illustration of the electrical circuit of said device.

In another embodiment of the invention, FIG. 3, the guide 15 contains an electromagnet 31 whose movable element is connected to the locking finger member 18. The transmission by a cable is then replaced by an electric conductor connecting the coil of the electromagnet 31 to a switch 35 disposed on the gear shift lever 4 and adapted to be actuated by the driver of the vehicle when selecting the reverse speed so as to supply current from the power source 32 to the electromagnet 31 and thereby shift the finger member 18 away from its locking position.

Having now described our invention what we claim as new and desire to secure by Letters Patent is:

1. A manual control device in combination with a gear box having two movable elements and a body of an automobile vehicle, said device comprising a gear shift lever located relatively remote from the gear box and carried by a bearing mounted on the body of the vehicle, at least one articulated rod and a bell crank lever connecting the gear shift lever to said two movable elements, so that, by a given pivoting of the gear shift lever successively in two directions substantially perpendicular to each other, each speed ratio of the gear box is selected and then engaged, the device further comprising first abutment means and second abutment means which cooperate upon a pivoting of the gear shift lever toward a reverse speed position, and means for disengaging said two abutment means and comprising a lever pivotally mounted on the gear box and connected to the gear shift lever through said rod, the first abutment means being mounted on the gear box and the second abutment means being disposed on the lever which is pivotally mounted on the gear box, wherein one of the abutment means is a retractable locking finger member and means connects the finger member to the gear shift lever; and further including a flexible bearing connected to the body and located in the vicinity of the gear shift lever, and a universal articulation connected to the gear box, a selecting rod which is pivotable substantially about the axis of the selecting rod in said flexible bearing and on said universal articulation, the gear shift lever being connected to said selecting rod to pivot about an axis perpendicular to the selecting rod and perpendicular to the gear shift lever, and a bell crank selecting lever fixed on the selecting rod in the vicinity of the universal articulation and carrying the locking finger member.

2. A control device according to claim 1, wherein the means which connect the finger member to the gear shift lever comprises a transmission cable.

3. A control device according to claim 1, wherein the means which connect the finger member to the gear shift lever connects the finger member to an element carried by the gear shift lever.

4. A control device according to claim 1, wherein the locking finger member is connected to a movable element of an electromagnet and the means which connect the finger member to the gear shift lever is electrical including the electromagnet and a switch carried by the gear shift lever.

5. A control device according to claim 1, wherein the first abutment means comprise a portion of an element which carries said universal articulation and is fixed to the gear box.

6. A control device according to claim 1, comprising a guide connected to the selecting lever and in which guide the locking finger member is slidable in a direction parallel to the pivot axis of the rod and is biased by a spring towards a position in which the locking finger member is capable of cooperating with the first abutment means which are in the form of an abutment connected to the gear box.

7. A manual control device in combination with a gear box having two movable elements and a body of an automobile vehicle, said device comprising a gear shift lever located relatively remote from the gear box and carried by a bearing mounted on the body of the vehicle, at least one articulated rod and a bell crank lever connecting the gear shift lever to said two movable elements, so that, by a given pivoting of the gear shift lever successively in two directions substantially perpendicular to each other, each speed ratio of the gear box is selected and then engaged, the device further comprising first abutment means and second abutment means which cooperate upon a pivoting of the gear shift lever toward a reverse speed position, and means for disengaging said two abutment means and comprising a lever pivotally mounted on the gear box and connected to the gear shift lever through said rod, the first abutment means being mounted on the gear box and the second abutment means being disposed on the lever which is pivotally mounted on the gear box, wherein one of the abutment means is a retractable locking finger member and means comprising a transmission cable connect the finger member to the gear shift lever; a further including a guide connected to the selecting lever and in which guide the locking finger member is slidable in a direction parallel to the pivot axis of the rod and is biased by a spring towards a position in which the locking finger member is capable of cooperating with the first abutment means which are in the form of an abutment connected to the gear box, and a sleeve axially slidable on the gear shift lever, the transmission cable having an end portion which is connected to the locking finger member and a sheath for the cable bearing against the guide, the cable having an opposite end portion connected to the sleeve which is axially slidable on the gear shift lever, and the gear shift lever carrying a lug against which the sheath of the cable bears.

* * * * *